(12) United States Patent
Ptasinski et al.

(10) Patent No.: US 7,045,784 B1
(45) Date of Patent: May 16, 2006

(54) METHOD AND APPARATUS FOR MICRO-GOLAY CELL INFRARED DETECTORS

(75) Inventors: Joanna N. Ptasinski, San Diego, CA (US); Randy L. Shimabukuro, San Diego, CA (US); Stephen D. Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 222 days.

(21) Appl. No.: 10/739,666

(22) Filed: Dec. 18, 2003

(51) Int. Cl.
*G01J 5/00* (2006.01)

(52) U.S. Cl. .............................. 250/338.1; 250/336.1; 250/332

(58) Field of Classification Search ............. 250/338.1, 250/332
See application file for complete search history.

(56) References Cited

U.S. PATENT DOCUMENTS 4,788,428 A * 11/1988 Metcalf et al. ............. 250/332
2002/0033453 A1 * 3/2002 Sauer et al. ............. 250/338.1

FOREIGN PATENT DOCUMENTS

JP         08184501 A   *  7/1996

OTHER PUBLICATIONS

T. W. Kenny et al, Micromachined Electron Tunneling Infrared Sensors, 1992 IEEE, 0-7803-0456-X/92.
Kaoru Yamashita et al, Golay-Cell Type of Miniaturized Infrared Sensor Using Si-Diaphragm, 1997 IEEE.

* cited by examiner

*Primary Examiner*—Renee Luebke
*Assistant Examiner*—Mary Zettl
(74) *Attorney, Agent, or Firm*—Allan Y. Lee; Michael A. Kagan; Andrew J. Cameron

(57) ABSTRACT

A method and apparatus for micro-Golay cell infrared detector. The detector includes a microchannel plate array, sealing membrane, flexible membrane, IR absorbent medium and thermally reactive medium. The microchannel plate array has an upper surface and a lower surface and includes chamber walls and chambers. The sealing membrane is operatively coupled to the microchannel plate array and is capable of sealing the lower surface. The flexible membrane is operatively coupled to the upper surface and is capable of deforming. The IR absorbent medium is operatively coupled to the chambers and is capable of converting IR radiation into heat. The thermally reactive medium is contained within the chambers and is capable of changing volume in response to temperature changes.

23 Claims, 6 Drawing Sheets

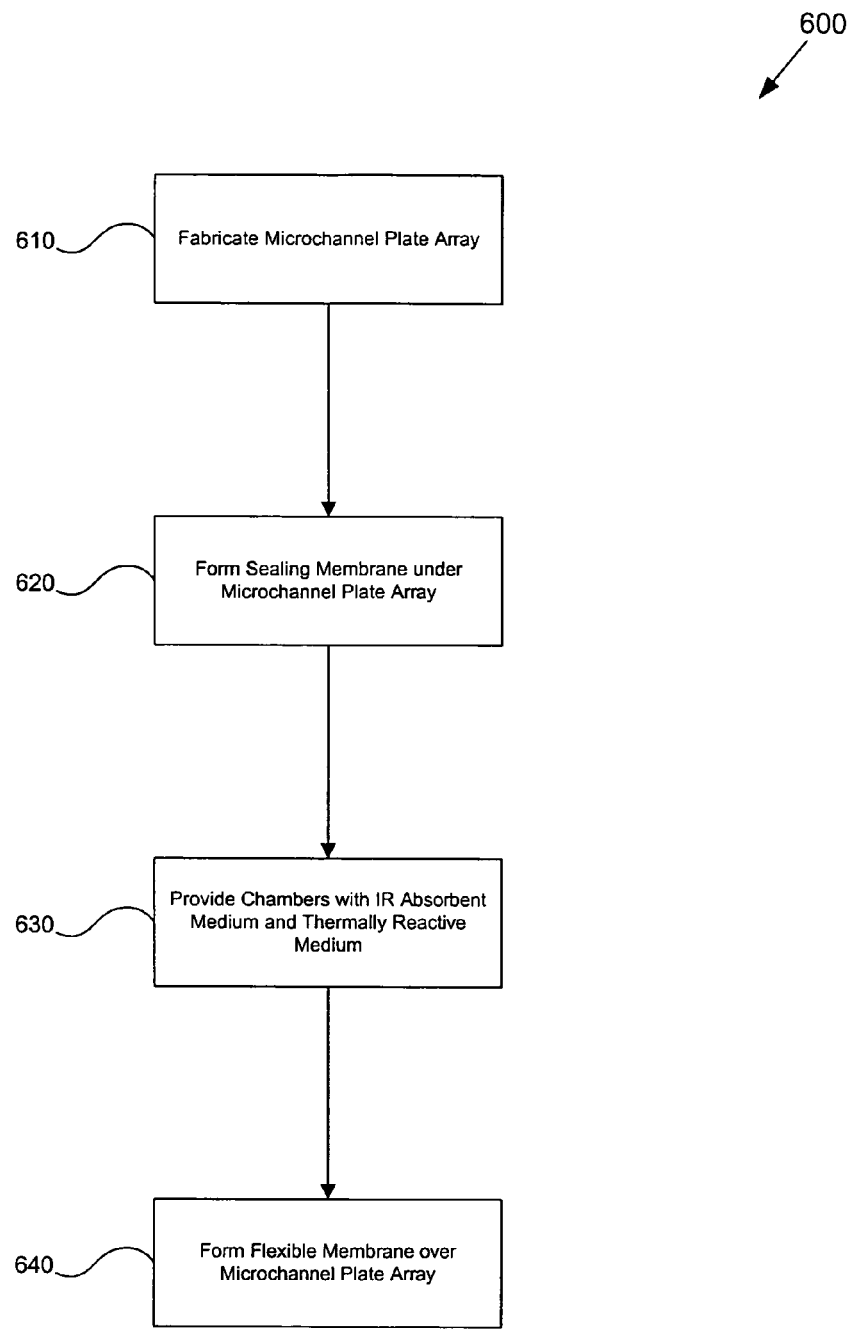

METHOD AND APPARATUS FOR MICRO-GOLAY CELL INFRARED DETECTORS

BACKGROUND OF THE INVENTION

The present invention is generally in the field of infrared detectors. More specifically, the invention is in the field of micro-Golay cell infrared detectors.

Typical infrared detectors are expensive to fabricate (e.g., fully metalized MEMS fabrication) and have low resolution (e.g., greater than 120 microns).

Therefore, a need exists for infrared detectors that are inexpensive to fabricate and have high resolution.

BRIEF DESCRIPTION OF THE DRAWINGS

FIG. 6 is a flowchart of an exemplary method of fabricating an embodiment of the present invention.

DETAILED DESCRIPTION OF THE INVENTION

The present invention is directed to a method and apparatus for micro-Golay cell infrared detectors. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention that use the principles of the present invention are not specifically described in the present application and are not specifically illustrated by the present drawings.

The present inventive method and apparatus for micro-Golay cell infrared detectors includes microchannel plate arrays, infrared ("IR") absorbent mediums and thermally reactive mediums. In one embodiment, the present invention is inexpensive to fabricate. In one embodiment, the present invention has high resolution. The present invention is particularly useful in image sensors.

Figure 1B:
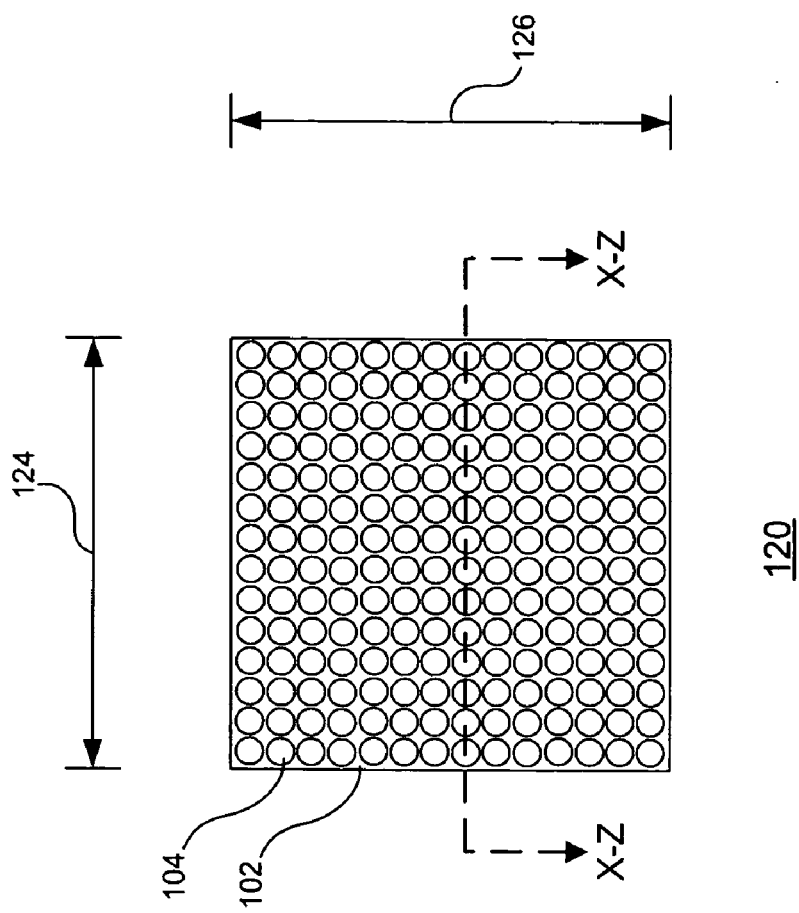
FIG. 1B is a cross-sectional top view of an exemplary embodiment of the present invention.
Figure 1A:
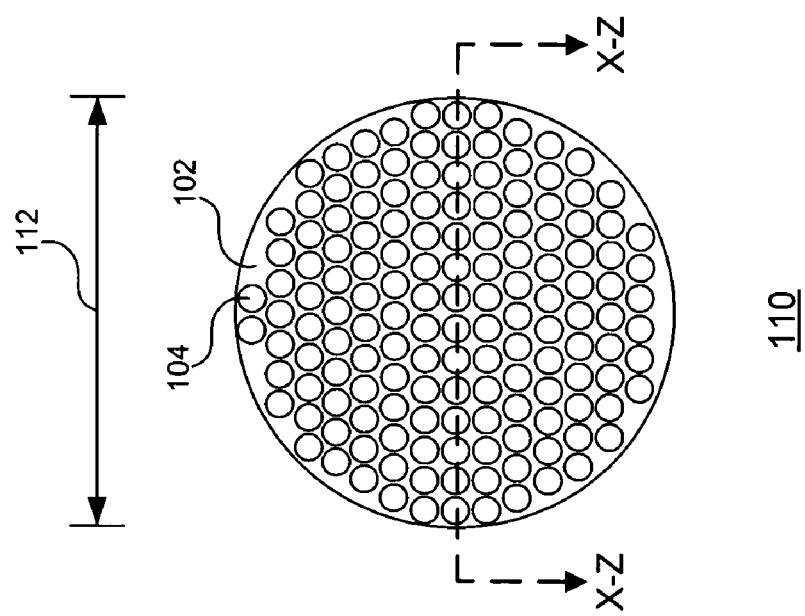
FIG. 1A is a cross-sectional top view of an exemplary embodiment of the present invention.

FIGS. 1A and 1B are cross-sectional top views of exemplary embodiments of the present invention. Micro-Golay cell ("MGC") IR detectors 110 and 120 of FIGS. 1A and 1B include flexible membranes, IR absorbent mediums, thermally reactive mediums, sealing membranes (all not shown in FIGS. 1A and 1B) and microchannel plate array 102. As shown in FIGS. 1A and 1B, microchannel plate array 102 includes a plurality of chambers 104 and walls, which define chambers 104. As described in detail further below with reference to FIGS. 2–5, chambers 104 contain thermally reactive mediums and are operatively coupled to IR absorbent mediums. Microchannel plate array 102 can be formed by a plurality of tightly packed hollow tubes or capillaries. Microchannel plate array 102 can be fabricated by any known technique. An exemplary technique for fabricating microchannel plate array 102 is now described.

An exemplary technique for fabricating microchannel plate array 102 includes the following steps: forming optical fiber preforms, fusing a plurality of optical fiber preforms to form a bundle, thermally treating and mechanically pulling or drawing the bundle to a desired bundle dimension, dicing the bundle into wafers and etching the wafers to remove the core of each optical fiber preform, which forms microcapillary channels (or chambers). In one embodiment, the optical fiber preforms comprise glass. In one embodiment, an optical fiber preform comprises a doped glass core coaxially surrounded by an undoped glass cladding. In one embodiment, the bundle has a circular configuration. In an exemplary circular embodiment, the bundle dimension is approximately 1 cm in diameter. In one embodiment, the bundle has a parallelogram configuration. In one embodiment, the bundle has a rectangular configuration. In one embodiment, the bundle has a square configuration. In one embodiment, the wafers have a height approximately equal to 400 microns. In one embodiment, the wafer has a height approximately equal to 460 microns. In one embodiment, the bundle is diced into wafers so that the microcapillary channels are substantially normal (i.e., 90 degrees) to the wafer surface. In one embodiment, the bundle is diced into wafers so that the microcapillary channels are not normal to the wafer surface. In one embodiment, the microcapillary channels are approximately five degrees non-normal to the wafer surface. Other exemplary techniques for fabricating microchannel plate arrays include etching plastics, polyimides, carbonates and a combination of the preceding elements.

FIG. 1A is a cross-sectional top view of an exemplary embodiment of the present invention. As shown in FIG. 1A, MGC IR detector 110 has a circular configuration and diameter approximately equal to length 112. In one embodiment of MGC IR detector 110, length 112 is equal to approximately 1 cm and MGC IR detector 110 includes hundreds of thousands of chambers 104. Those skilled in the art shall recognize that length 112 can have other dimensions without departing from the scope or spirit of the present invention. In one embodiment, chambers 104 each have a cross-sectional diameter equal to approximately 10 microns and are spaced apart by walls having a thickness equal to approximately 2 microns.

FIG. 1B is a cross-sectional top view of an exemplary embodiment of the present invention. As shown in FIG. 1B, MGC IR detector 120 has a parallelogram configuration. In one embodiment, MGC IR detector 120 has a rectangular configuration. In one embodiment, MGC IR detector 120 has a square configuration. MGC IR detector 120 has length 124 and width 126. In one embodiment, length 124 and width 126 are each equal to approximately 1 cm and MGC IR detector 120 includes hundreds of thousands of chambers 104. Those skilled in the art shall recognize that length 124 and width 126 can have other dimensions without departing from the scope or spirit of the present invention. Those skilled in the art shall recognize that MGC IR detectors 110 and 120 can have different configurations such as triangular, without departing from the scope or spirit of the present invention.

Figure 2:
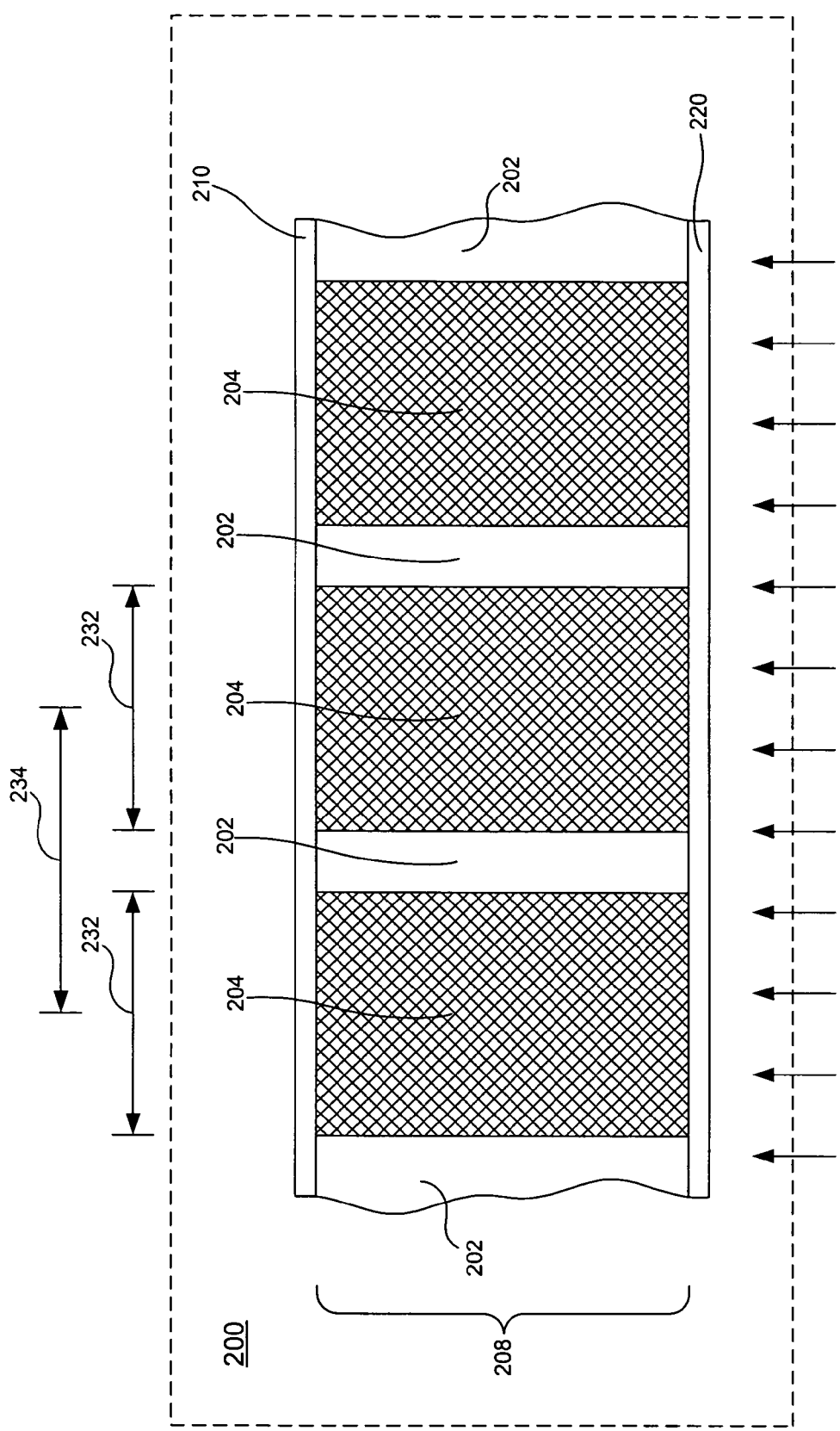
FIG. 2 is a partial cutaway side view along line X-Z of MGC IR detectors 110 and 120 of FIG. 1.

FIG. 2 is a partial cutaway side view along line X-Z of MGC IR detectors 110 and 120 of FIG. 1. MGC IR detector 200 is an exemplary embodiment of the present invention. As shown in FIG. 2, MGC IR detector 200 includes microchannel plate array 208, flexible membrane 210 and sealing membrane 220. Microchannel plate array 208 can be fabricated using techniques described above. Microchannel plate array 208 has an upper surface and a lower surface and further includes chamber walls 202 and chambers 204. In one embodiment, chamber walls 202 comprise glass. Those skilled in the art shall recognize that chamber walls 202 can comprise other materials such as photosensitive plastics, polyimides, polycarbonates and a combination of the preceding elements without departing from the scope or spirit of the present invention. Each chamber 204 has a diameter approximately equal to length 232 and are approximately spaced (longitudinal axial center-to-longitudinal axial center) by length 234. In one embodiment, length 232 is equal to approximately 10 microns and length 234 is equal to approximately 12 microns.

Chambers 204 of MGC IR detector 200 include IR absorbent mediums and thermally reactive mediums (not shown in FIG. 2). IR absorbent mediums expedite the conversion of IR radiation energy into heat. Thermally reactive mediums change volume in response to temperature changes. Examples of thermally reactive mediums include gases, solids, liquids and a combination of two or three of the aforementioned mediums. In one embodiment, MGC IR detector 200 uses thermally reactive mediums that increase in volume in response to temperature increases. In one embodiment, MGC IR detector 200 uses thermally reactive mediums that decrease in volume in response to temperature increases. In one embodiment, thermally reactive mediums comprise a gas ambient that increases volume when heated.

In a dual-purpose medium embodiment, chambers 204 include dual-purpose mediums that can be used as both thermally reactive mediums and IR absorbent mediums. An exemplary dual-purpose medium is an IR absorbent gas that absorbs IR radiation, which produces heat, and thermally reacts to changes in temperature. Exemplary IR absorbent gases include acetone and toluene. As described further below with regard to FIGS. 3–5, dual-purpose mediums can be used in conjunction with other IR absorbent mediums without departing from the scope or spirit of the present invention. Thermally reactive mediums and IR absorbent mediums are contained in chambers 204 by flexible membrane 210 and sealing membrane 220.

As shown in FIG. 2, sealing membrane 220 is formed under the lower surface of microchannel plate array 208. Sealing membrane 220 comprises a substantially non-flexible material that is IR transparent (i.e., allows IR radiation to pass) such as silicon, germanium, gallium arsenide, calcium fluoride, magnesium fluoride, potassium bromide, zinc selenide, zinc sulfide and sapphire. Those skilled in the art shall recognize that sealing membrane 220 can comprise a flexible material without departing from the scope and spirit of the present invention. Sealing membrane 220 can be formed under the lower surface of microchannel plate array 208 by known techniques such as diffusion bonding. Sealing membrane 220 seals and defines the lower portion of chambers 204. In one embodiment, sealing membrane 220 and chamber walls 202 form lower seals of chambers 204.

As shown in FIG. 2, flexible membrane 210 is formed over the upper surface of microchannel plate array 208. Flexible membrane 210 comprises a flexible material capable of deforming. Exemplary flexible materials include silicon rubber, parylene, the class of polyimides and a combination of the preceding elements. In one embodiment, flexible membrane 210 is relatively thin. In one embodiment, flexible membrane 210 is approximately equal to 30 microns. In one embodiment, flexible membrane 210 has a Young's modulus approximately equal to $0.1e006$ N/m$^2$. In one embodiment, flexible membrane 210 deforms approximately 0.659 microns per 1 degree Kelvin change of temperature. Flexible membrane 210 can be formed over the upper surface of microchannel plate array 208 by known techniques such as mechanical and chemical bonding, spin casting and evaporation sputtering. Flexible membrane 210 defines the upper portion of chambers 204. In one embodiment, flexible membrane 210 and chamber walls 202 form upper seals of chambers 204. Flexible membrane 210 can be operatively coupled to deflection sensors (not shown in FIG. 2), which are capable of monitoring deflections in flexible membrane 210 for further processing (e.g., image sensors). Exemplary deflection monitoring devices include interferometry, reflectometry and scattering techniques and electrical on-membrane readout.

An exemplary operation of MGC IR detector 200 is now described. IR radiation (shown on FIG. 2 as vertical, single-headed arrows) enters MGC IR detector 200 through sealing membrane 220. Sealing membrane 220 passes IR radiation into chambers 204. IR absorbent mediums contained in chambers 204 convert the passed IR radiation into heat. Thermally reactive mediums contained in chambers 204 increase in volume in response to the temperature increase due to heat. Flexible membrane 210 deflects upward in response to the volume increase of the thermally reactive mediums. A deflection monitoring system monitors deflections in flexible membrane 210 and inputs associated data to an optical image sensor display device.

Figure 3:
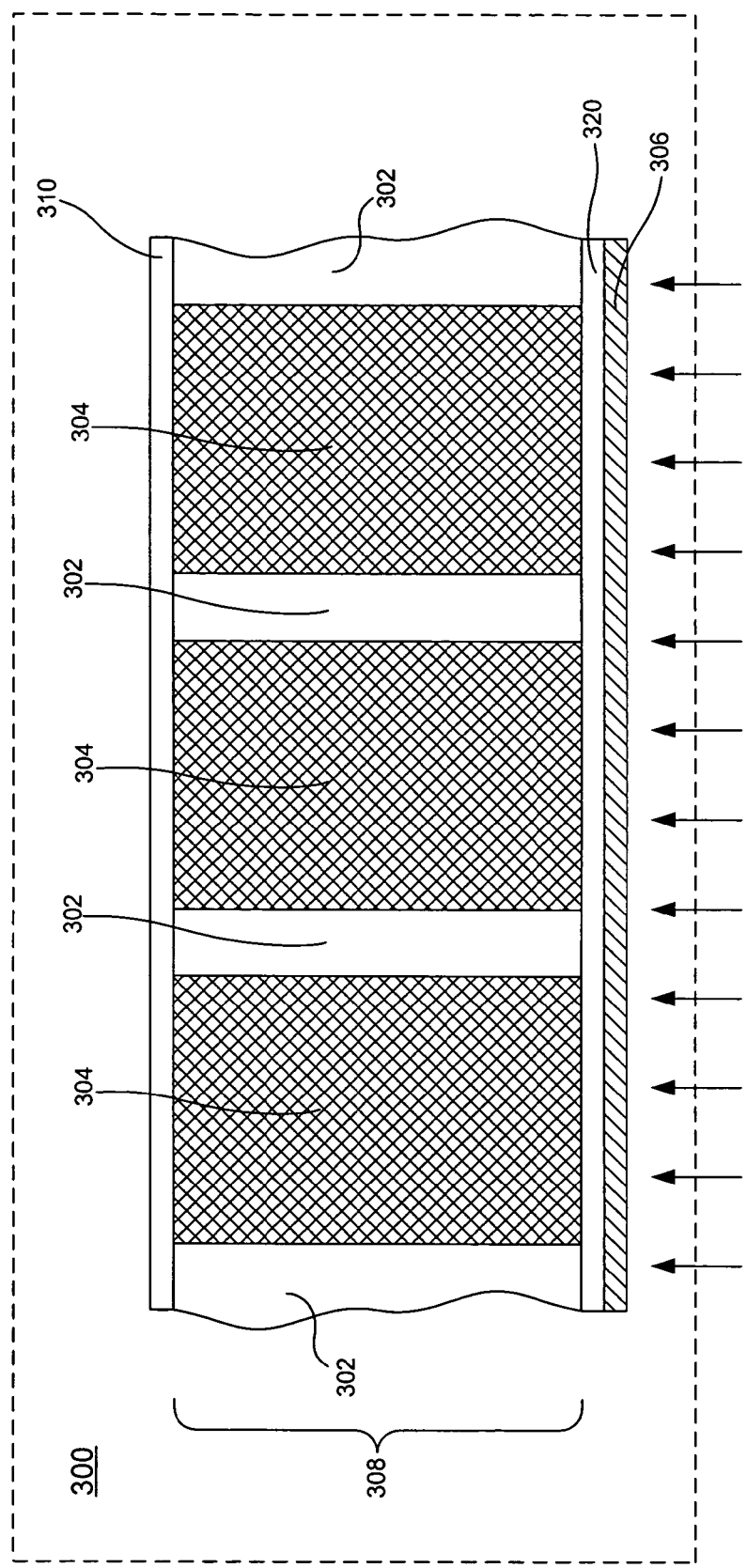
FIG. 3 is a partial cutaway side view along line X-Z of MGC IR detectors 110 and 120 of FIG. 1.

FIG. 3 is a partial cutaway side view along line X-Z of MGC IR detectors 110 and 120 of FIG. 1. MGC IR detector 300 is an exemplary embodiment of the present invention. MGC IR detector 300 is substantially similar to MGC IR detector 200 of FIG. 2, and thus, similar elements are not described hereinagain. As shown in FIG. 3, MGC IR detector 300 includes microchannel plate array 308, flexible membrane 310, sealing membrane 320 and IR absorbent medium 306. Microchannel plate array 308 has an upper surface and a lower surface and further includes chamber walls 302 and chambers 304. Chambers 304 contain thermally reactive mediums. In one embodiment, chambers 304 contain dual-purpose mediums.

As shown in FIG. 3, IR absorbent medium 306 is formed under sealing membrane 320. In one embodiment, IR absorbent medium 306 is also referred to as IR absorbent layer 306. In one embodiment, sealing membrane 320 and IR absorbent medium 306 are in reverse position (i.e., sealing membrane 320 is formed under IR absorbent medium 306, which is formed under the lower surface of microchannel plate array 308). In one embodiment, IR absorbent medium 306 constitutes sealing membrane 320. In one embodiment, IR absorbent medium 306 is situated under selected areas of sealing membrane 320 such as below chambers 304. Sealing membrane 320 comprises a substantially non-flexible material that conducts heat. Sealing membrane 320, unlike sealing membrane 220 of FIG. 2, does not have to be IR transparent. In a dual-purpose medium embodiment of MGC IR detector 300, sealing membrane 320 is IR transparent. IR absorbent medium 306 comprises an IR absorbent material such as porous carbon, carbon black and gold black. IR absorbent medium 306 increases the response of MGC IR detector 300.

An exemplary operation of MGC IR detector 300 is now described. IR radiation (shown on FIG. 3 as vertical, single-headed arrows) enters MGC IR detector 300 through IR absorbent medium 306, which converts IR radiation into heat. Sealing membrane 320 passes heat into chambers 304 via sealing membrane 320. Thermally reactive mediums contained in chambers 304 increase in volume in response to the temperature increase due to heat. Flexible membrane 310 deflects upward in response to the volume increase of the thermally reactive mediums. A deflection monitoring system monitors deflections in flexible membrane 310 and inputs associated data to an optical image sensor display device.

Figure 4:
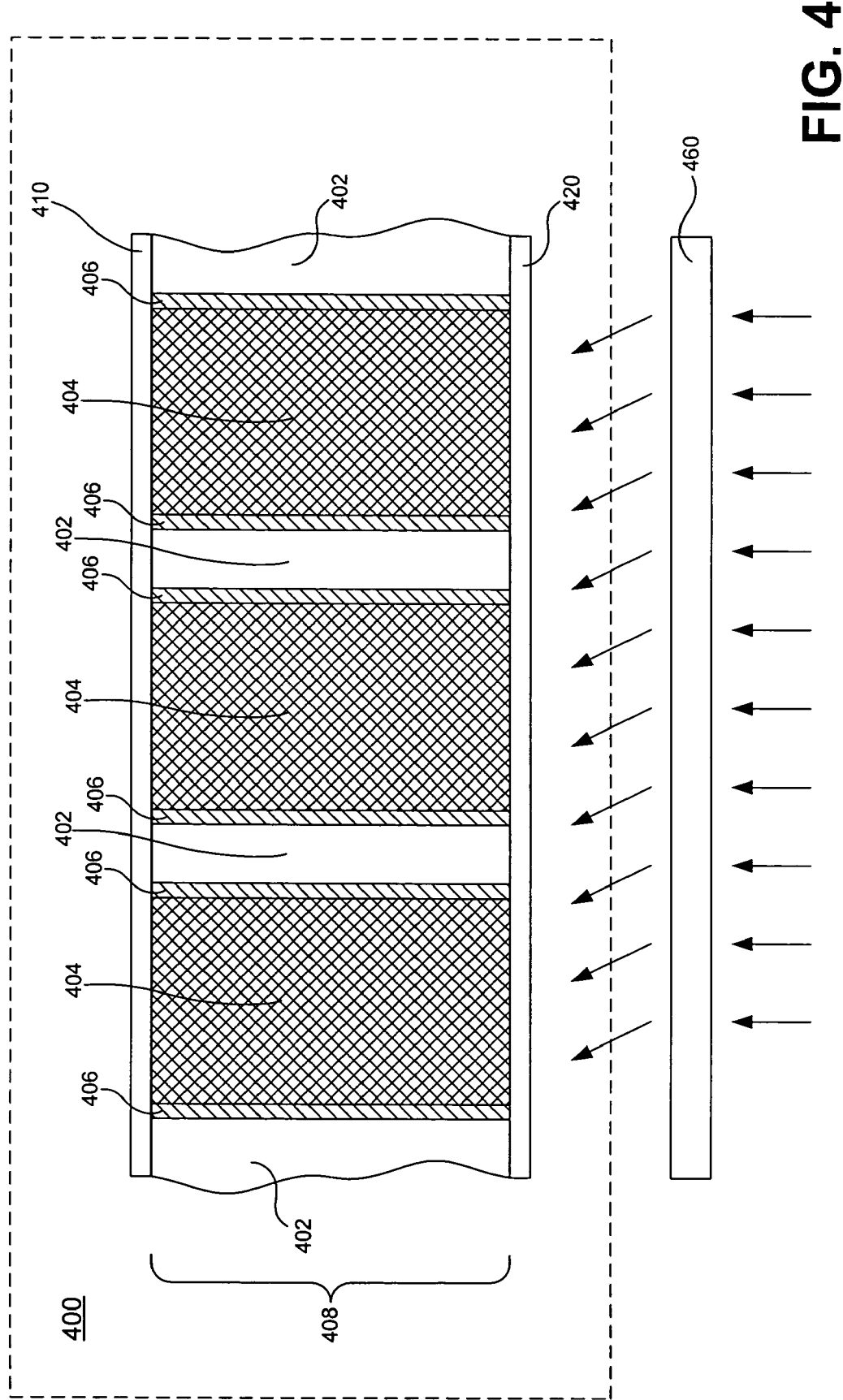
FIG. 4 is a partial cutaway side view along line X-Z of MGC IR detectors 110 and 120 of FIG. 1.

FIG. 4 is a partial cutaway side view along line X-Z of MGC IR detectors 110 and 120 of FIG. 1. MGC IR detector 400 is an exemplary embodiment of the present invention. MGC IR detector 400 is substantially similar to MGC IR detector 200 of FIG. 2, and thus, similar elements are not described hereinagain. As shown in FIG. 4, MGC IR detector 400 includes microchannel plate array 408, flexible membrane 410, sealing membrane 420 and IR absorbent mediums 406. Microchannel plate array 408 has an upper surface and a lower surface and further includes chamber walls 402 and chambers 404. Chambers 404 contain thermally reactive mediums. In one embodiment, chambers 404 contain dual-purpose mediums.

As shown in FIG. 4, IR absorbent medium 406 is formed between chamber walls 402 and chambers 404. Exemplary methods for forming IR absorbent medium 406 include vapor deposition, spin-casting, evaporation and sputtering. In one embodiment, IR absorbent medium 406 is situated on selected areas between chamber walls 402 and chambers 404 such as the left cylindrical side. In one embodiment, IR absorbent medium 406 is also situated under sealing membrane 420. In one embodiment IR absorbent medium 406 is also situated between sealing membrane 420 and microchannel plate array 408. In one embodiment, IR absorbent medium 406 is also referred to as IR absorbent layer 406. IR absorbent mediums 406 comprise an IR absorbent material such as porous carbon, carbon black and gold black. Sealing membrane 420 comprises a substantially non-flexible material that is IR transparent. In one embodiment, MGC IR detector 400 is used in conjunction with IR optical element 460, which is capable of redirecting IR radiation. Examples of optical element 460 include a lens, mirror and diffractive optic.

An exemplary operation of MGC IR detector 400 is now described. IR radiation (shown on FIG. 4 as single-headed arrows) enters MGC IR detector 400 at an angle relative to IR absorbent mediums 406 due to the redirection of IR optical element 460. Sealing membrane 420 passes IR radiation into chambers 404 via sealing membrane 420. IR absorbent mediums 406 convert IR radiation into heat. Thermally reactive mediums contained in chambers 404 increase in volume in response to the temperature increase due to heat. Flexible membrane 410 deflects upward in response to the volume increase of the thermally reactive mediums. A deflection monitoring system monitors deflections in flexible membrane 410 and inputs associated data to an optical image sensor display device.

Figure 5:
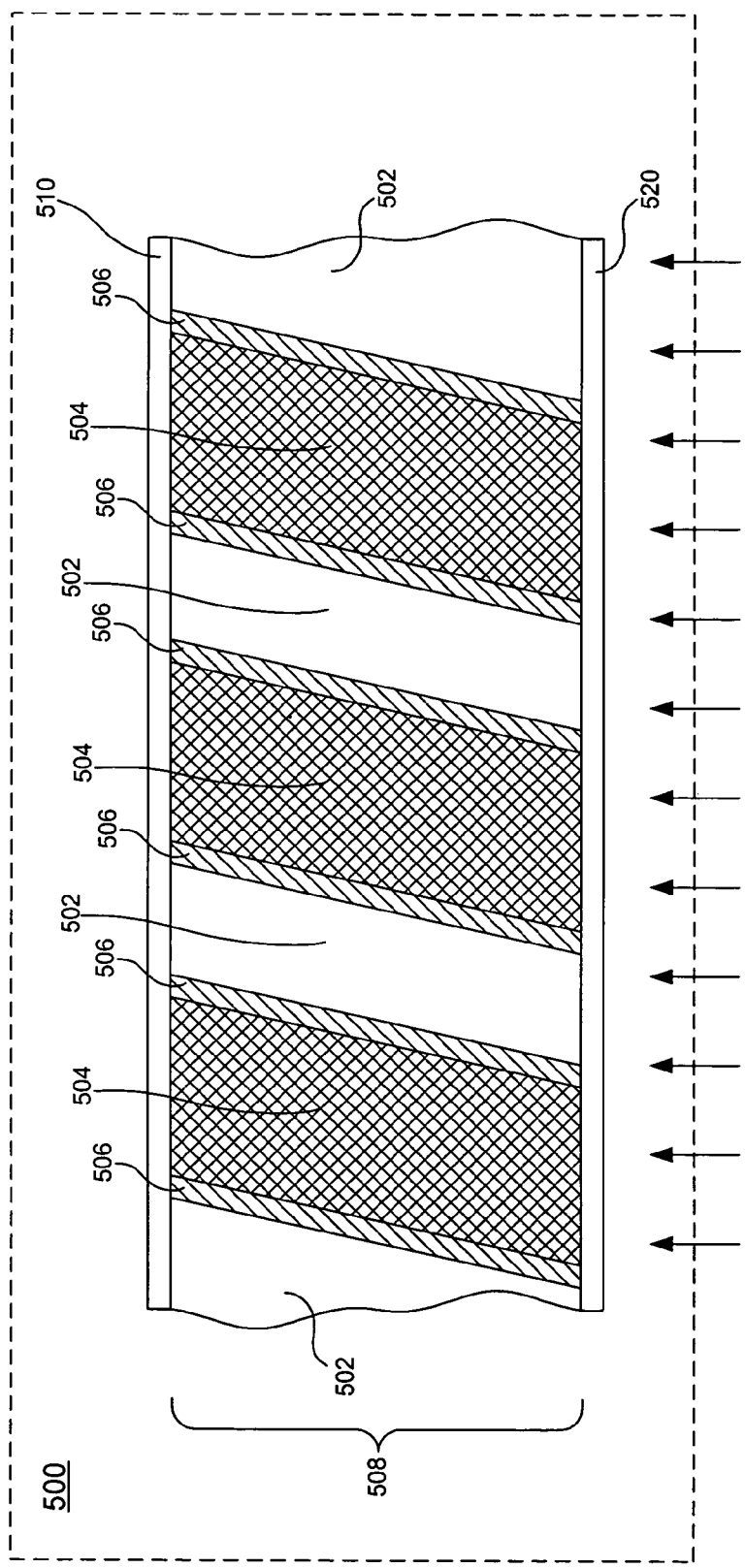
FIG. 5 is a partial cutaway side view along line X-Z of MGC IR detectors 110 and 120 of FIG. 1.

FIG. 5 is a partial cutaway side view along line X-Z of MGC IR detectors 110 and 120 of FIG. 1. MGC IR detector 500 is an exemplary embodiment of the present invention. MGC IR detector 500 is substantially similar to MGC IR detector 400 of FIG. 4, and thus, similar elements are not described hereinagain. As shown in FIG. 5, MGC IR detector 500 includes microchannel plate array 508, flexible membrane 510, sealing membrane 520 and IR absorbent mediums 506. In one embodiment, IR absorbent mediums 506 is also referred to as IR absorbent layers 506. Microchannel plate array 508 has an upper surface and a lower surface and further includes chamber walls 502 and chambers 504 that are non-normal relative to the wafer surface, which is substantially parallel to a horizontal plane in FIG. 5. IR absorbent mediums 506 are formed between chamber walls 502 and chambers 504. In one embodiment, the chamber walls 502, chambers 504 and IR absorbent mediums 506 are approximately five degrees non-normal relative to the wafer surface. Chambers 504 contain thermally reactive mediums. In one embodiment, chambers 504 contain dual-purpose mediums.

An exemplary operation of MGC IR detector 500 is now described. IR radiation (shown on FIG. 5 as vertical, single-headed arrows) enters MGC IR detector 500 via sealing membrane 520. Sealing membrane 520 passes IR radiation into chambers 504 via sealing membrane 520. IR absorbent mediums 506 convert IR radiation into heat. Thermally reactive mediums contained in chambers 504 increase in volume in response to the temperature increase due to heat. Flexible membrane 510 deflects upward in response to the volume increase of the thermally reactive mediums. A deflection monitoring system monitors deflections in flexible membrane 410 and inputs associated data to an optical image sensor display device.

FIG. 6 is a flowchart of an exemplary method of fabricating an embodiment of the present invention. Certain details and features have been left out of flowchart 600 of FIG. 6 that are apparent to a person of ordinary skill in the art. For example, a step may consist of one or more sub-steps or may involve specialized equipment or materials, as known in the art. While STEPS 610 through 640 shown in flowchart 600 are sufficient to describe one embodiment of the present invention, other embodiments of the invention may utilize steps different from those shown in flowchart 600.

Referring to FIG. 6, at STEP 610 in flowchart 600, the method fabricates a microchannel plate array in any known method such as described above. In one embodiment, the microchannel plate array is fabricated by etching photosensitive plastics. In one embodiment, the microchannel plate array is fabricated by etching photosensitive polyimides. In one embodiment, the microchannel plate array is fabricated by etching polycarbonates. The microchannel plate array includes chamber walls and chambers. After STEP 610, the method of flowchart 600 of FIG. 6 proceeds to STEP 620.

At STEP 620 in flowchart 600, the method forms a sealing membrane under the microchannel plate array. In one embodiment, the sealing membrane comprises a substantially non-flexible material. In one embodiment, the sealing membrane comprises a flexible material. Sealing membrane 220 can be formed under the lower surface of microchannel plate array 208 by known techniques such as diffusion bonding. After STEP 620, the method of flowchart 600 of FIG. 6 proceeds to STEP 630.

At STEP 630 in flowchart 600, the method provides the chambers of the microchannel plate array with an IR absorbent medium and a thermally reactive medium. Examples of IR absorbent mediums include porous carbon, carbon black and gold black. Examples of thermally reactive mediums include gas ambients. In one embodiment, the method provides the chambers of the microchannel plate array with dual-purpose mediums. Examples of dual-purpose mediums include IR absorbent gases such as acetone and toluene. After STEP 630, the method of flowchart 600 of FIG. 6 proceeds to STEP 640. Several embodiments of the method at STEP 630 are now described.

In one embodiment of the method at STEP 630, the method includes the following sub-STEPS: forming an IR absorbent medium on the chamber walls and providing a thermally reactive medium within the chambers. In one embodiment of the method at STEP 630, the method includes the sub-STEP of providing a dual-purpose medium within the chambers. In one embodiment of the method at STEP 630, the method includes the following sub-STEPS: forming an IR absorbent medium on the sealing membrane and providing a thermally reactive medium within the chambers. In one embodiment of the method at STEP 630, the method includes the following sub-STEPS: forming an IR absorbent medium on the sealing membrane and providing a dual-purpose medium within the chambers. In one embodiment of the method at STEP 630, the method includes the following sub-STEPS: forming an IR absorbent medium on the chamber walls and providing a dual-purpose medium within the chambers. In one embodiment of the method at STEP 630, the method includes the following sub-STEPS: forming an IR absorbent medium on the chamber walls and sealing membrane and providing a thermally reactive medium within the chambers. In one embodiment of the method at STEP 630, the method includes the following sub-STEPS: forming an IR absorbent medium on the chamber walls and sealing membrane and providing a dual-purpose medium within the chambers.

At STEP 640 in flowchart 600, the method forms a flexible membrane over the microchannel plate array. The flexible membrane can be formed over the upper surface of the microchannel plate array by techniques such as mechanical and chemical bonding, spin casting, evaporation and sputtering. The flexible membrane comprises a flexible material capable of deforming such as silicon rubber, parylene, the class of polyimides and a combination of the preceding elements. Those skilled in the art shall recognize that STEPS 620–640 of the method of flowchart 600 of FIG. 6 can be rearranged without departing from the scope or spirit of the present invention. For example, the method can fabricate an embodiment of the invention by reversing the order of STEPS 620–640.

From the above description of the invention, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

We claim:

1. A micro-Golay cell infrared detector, comprising:
   a) a microcapillary chamber array having an upper surface and a lower surface and comprising chamber walls and chambers;
   b) a sealing membrane, operatively coupled to said microcapillary chamber array, capable of sealing said lower surface;
   c) a flexible membrane, operatively coupled to said upper surface, capable of deforming;
   d) an IR absorbent medium, operatively coupled to said sealing membrane, capable of converting IR radiation into heat;
   e) a thermally reactive medium, contained within said chambers, capable of changing volume in response to temperature changes.

2. The micro-Golay cell infrared detector of claim 1, wherein said IR absorbent medium is operatively coupled to said chamber walls.

3. The micro-Golay cell infrared detector of claim 1, wherein said microcapillary chamber array has a configuration selected from the group consisting of circular, parallelogram, rectangular and square.

4. The micro-Golay cell infrared detector of claim 3, wherein said microcapillary chamber array has a circular configuration having a bundle dimension of approximately 1 cm in diameter.

5. The micro-Golay cell infrared detector of claim 1, wherein said IR absorbent medium and said thermally reactive medium comprise a dual-purpose medium.

6. The micro-Golay cell infrared detector of claim 5, wherein said sealing membrane is IR transparent.

7. The micro-Golay cell infrared detector of claim 5, wherein said dual-purpose medium comprises an IR absorbent gas.

8. The micro-Golay cell infrared detector of claim 7, wherein said IR absorbent gas consists of a gas selected from the group consisting of acetone and toluene.

9. The micro-Golay cell infrared detector of claim 1, wherein said IR absorbent medium comprises a dual-purpose medium contained within said chambers and an IR absorbent layer.

10. The micro-Golay cell infrared detector of claim 9, wherein said IR absorbent layer is operatively coupled to said sealing membrane.

11. The micro-Golay cell infrared detector of claim 9, wherein said IR absorbent layer is operatively coupled to said chamber walls.

12. The micro-Golay cell infrared detector of claim 9, wherein said IR absorbent layer is operatively coupled to said sealing membrane and said chamber walls.

13. The micro-Golay cell infrared detector of claim 1, wherein said microcapillary chamber array has an orientation non-normal relative to a wafer surface.

14. The micro-Golay cell infrared detector of claim 1, wherein said chamber walls comprise a material selected from the group consisting of glass, polyimide, polycarbonate, plastic and a combination of the preceding elements.

15. The micro-Golay cell infrared detector of claim 1, wherein said flexible membrane comprises a material selected from the group consisting of silicon rubber, parylene, the class of polyimides and a combination of the preceding elements.

16. The micro-Golay cell infrared detector of claim 1, wherein said IR absorbent medium comprises a material selected from the group consisting of porous carbon, carbon black and gold black and a combination of the preceding elements.

17. A method for a micro-Golay cell infrared detector, the method comprising the steps of:
   a) forming a sealing membrane under a microcapillary chamber array, wherein said microcapillary chamber array comprises chamber walls and chambers;
   b) coupling said sealing membrane with an IR absorbent medium;

c) providing said chambers with said IR absorbent medium and a thermally reactive medium;

d) forming a flexible membrane over said microcapillary chamber array.

18. The method of claim 17, wherein said providing said chambers with said IR absorbent medium and said thermally reactive medium step comprises the following sub-steps:
   i) forming an IR absorbent medium on said chamber walls;
   ii) providing a thermally reactive medium within said chambers.

19. The method of claim 17, wherein said providing said chambers with said IR absorbent medium and said thermally reactive medium step comprises providing a dual-purpose medium within said chambers.

20. The method of claim 17, wherein said providing said chambers with said IR absorbent medium and said thermally reactive medium step comprises providing a dual-purpose medium within said chambers.

21. The method of claim 17, wherein said providing said chambers with said IR absorbent medium and said thermally reactive medium step comprises the following sub-steps:
   i) forming an IR absorbent medium on said chamber walls;
   ii) providing a dual-purpose medium within said chambers.

22. The method of claim 17, wherein said providing said chambers with said IR absorbent medium on said sealing membrane and said thermally reactive medium step comprises the following sub-steps:
   i) forming an IR absorbent medium on said chamber walls and said sealing membrane;
   ii) providing a thermally reactive medium within said chambers.

23. A micro-Golay cell infrared detector, comprising:
   a) means for forming a sealing membrane under a microcapillary chamber array, wherein said microcapillary chamber array comprises chamber walls and chambers;
   b) means for coupling said sealing membrane with an IR absorbent medium;
   c) means for providing said chambers with said IR absorbent medium and a thermally reactive medium;
   d) means for forming a flexible membrane over said microcapillary chamber array.

* * * * *